US012542103B2

(12) United States Patent
Jeong et al.

(10) Patent No.: US 12,542,103 B2
(45) Date of Patent: Feb. 3, 2026

(54) PIXEL OF A DISPLAY DEVICE CONNECTED TO DATA LINE THROUGH WHICH REFERENCE VOLTAGE IS TRANSFERRED AND DISPLAY DEVICE

(71) Applicant: Samsung Display Co., LTD., Yongin-si (KR)

(72) Inventors: Keuk-Jin Jeong, Yongin-si (KR); Wongyun Kim, Yongin-si (KR); Min Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/826,723

(22) Filed: Sep. 6, 2024

(65) Prior Publication Data

US 2025/0104630 A1 Mar. 27, 2025

(30) Foreign Application Priority Data

Sep. 21, 2023 (KR) ........................ 10-2023-0126543

(51) Int. Cl.

*G09G 3/32* (2016.01)
*G09G 3/3233* (2016.01)

(Continued)

(52) U.S. Cl.

CPC ............. *G09G 3/3233* (2013.01); *G09G 3/32* (2013.01); *G09G 3/3266* (2013.01); *G09G 3/3275* (2013.01); *G09G 2300/0426* (2013.01); *G09G 2300/0809* (2013.01); *G09G 2310/0216* (2013.01); *G09G 2310/0267* (2013.01);

(Continued)

(58) Field of Classification Search

CPC ...... G09G 3/32; G09G 3/3233; G09G 3/3266; G09G 3/3275; G09G 2310/0216; G09G 2310/0267; G09G 2310/0275; G09G 2310/08; G09G 2320/0233;

(Continued)

(56) References Cited

U.S. PATENT DOCUMENTS

2011/0267319 A1* 11/2011 Han ..................... G09G 3/3233 345/80
2025/0104610 A1* 3/2025 Jeong ................... G09G 3/3266

FOREIGN PATENT DOCUMENTS

CN 112509523 A 3/2021
CN 112908246 A * 6/2021

(Continued)

*Primary Examiner* — Adam J Snyder

(74) *Attorney, Agent, or Firm* — CANTOR COLBURN LLP

(57) ABSTRACT

A pixel includes a capacitor connected between a first power supply voltage line and a first node, a first transistor including a gate connected to the first node, a first terminal connected to a second node, and a second terminal connected to a third node, a second transistor including a gate receiving a scan signal, a first terminal connected to a data line, and a second terminal connected to the second node, a third transistor including a gate receiving the scan signal, a first terminal connected to the third node, and a second terminal connected to the first node, a fourth transistor including a gate connected to the second node, a first terminal connected to an initialization voltage line, and a second terminal connected to the first node, and a light emitting element connected to the third node and a second power supply voltage line.

18 Claims, 9 Drawing Sheets

(51) Int. Cl.
*G09G 3/3266* (2016.01)
*G09G 3/3275* (2016.01)

(52) U.S. Cl.
CPC ............... *G09G 2310/0275* (2013.01); *G09G 2310/061* (2013.01); *G09G 2310/08* (2013.01); *G09G 2320/0233* (2013.01)

(58) Field of Classification Search
CPC ... G09G 2300/0426; G09G 2300/0809; G09G 2310/061
See application file for complete search history.

(56) References Cited

FOREIGN PATENT DOCUMENTS

| | | | |
|---|---|---|---|
| KR | 102176454 | B1 | 11/2020 |
| KR | 102323292 | B1 | 11/2021 |

* cited by examiner

PIXEL OF A DISPLAY DEVICE CONNECTED TO DATA LINE THROUGH WHICH REFERENCE VOLTAGE IS TRANSFERRED AND DISPLAY DEVICE

This application claims priority to Korean Patent Application No. 10-2023-0126543, filed on Sep. 21, 2023, and all the benefits accruing therefrom under 35 U.S.C. § 119, the content of which in its entirety is herein incorporated by reference.

BACKGROUND

1. Field

Embodiments of the invention relate to a display device, and more particularly to a pixel and a display device including the pixel.

2. Description of the Related Art

Driving transistors of pixels of a display device, such as an organic light emitting diode (OLED) display device, may have different threshold voltages due to a process variation, a degradation, etc. Because of this threshold voltage variation, the pixels of the display device may not emit light with uniform luminance. To prevent or reduce the luminance non-uniformity, a pixel for performing a compensation operation that compensates for a threshold voltage of a driving transistor has been developed. For example, to perform the compensation operation in a diode connection method, the pixel may diode-connect a driving transistor, and may transfer a data voltage to a gate node of the driving transistor through the diode-connected driving transistor. Thus, in the pixel, the data voltage in which a threshold voltage of the driving transistor is compensated may be applied to the gate node.

In the pixel performing the compensation operation in the diode connection method, the gate node may be initialized to an initialization voltage lower than the data voltage before the data voltage is applied to the gate node. The pixel may receive an initialization signal to provide the initialization voltage to the gate node.

SUMMARY

Some embodiments provide a pixel of a display device that performs a compensation operation without using an initialization signal.

Some embodiments provide a display device that performs a compensation operation without using an initialization signal.

According to embodiments, a pixel of a display device includes a capacitor connected between a line, which transfers a first power supply voltage, and a first node, a first transistor including a gate connected to the first node, a first terminal connected to a second node, and a second terminal connected to a third node, a second transistor including a gate which receives a scan signal, a first terminal connected to a data line, and a second terminal connected to a second node, a third transistor including a gate which receives the scan signal, a first terminal connected to the third node, and a second terminal connected to the first node, a fourth transistor including a gate connected to the second node, a first terminal connected to a line which transfers an initialization voltage, and a second terminal connected to the first node, and a light emitting element including an anode connected to the third node, and a cathode connected to a line which transfers a second power supply voltage.

In embodiments, the fourth transistor may be turned on in response to a reference voltage transferred to the second node through the data line and the second transistor.

In embodiments, the initialization voltage may be higher than the reference voltage.

In embodiments, the fourth transistor may be turned off in response to a data voltage transferred to the second node through the data line and the second transistor.

In embodiments, the initialization voltage may be lower than the data voltage.

In embodiments, the pixel may further include a fifth transistor connected between the line, which transfers the first power supply voltage, and the second node, where the fifth transistor may receive an emission signal, and a sixth transistor connected between the third node and the anode of the light emitting element, where the sixth transistor may receive the emission signal.

In embodiments, the fifth transistor may include a gate which receives the emission signal, a first terminal connected to the line which transfers the first power supply voltage, and a second terminal connected to the second node, and the sixth transistor may include a gate which receives the emission signal, a first terminal connected to the third node, and a second terminal connected to the anode of the light emitting element.

In embodiments, the first through sixth transistors may be P-type metal oxide semiconductor (PMOS) transistors.

In embodiments, a frame period for the pixel may include an initialization period in which the first node and the third node are initialized, a data writing and compensation period in which a data voltage is provided through the data line, and an emission period in which the light emitting element emits light.

In embodiments, in the initialization period, the scan signal may have a first level, the emission signal may have a second level, a reference voltage may be provided through the data line, the second transistor may transfer the reference voltage of the data line to the second node in response to the scan signal having the first level, the fourth transistor may transfer the initialization voltage to the first node in response to the reference voltage of the second node, the third transistor may transfer the initialization voltage of the first node to the third node in response to the scan signal having the first level, and the first node and the third node may be initialized based on the initialization voltage.

In embodiments, in the data writing and compensation period, the scan signal may have a first level, the emission signal may have a second level, a data voltage may be provided through the data line, the second transistor may transfer the data voltage of the data line to the second node in response to the scan signal having the first level, the third transistor may diode-connect the first transistor in response to the scan signal having the first level, and a voltage obtained by subtracting a threshold voltage of the first transistor from the data voltage may be applied to the first node through the diode-connected first transistor.

In embodiments, in the emission period, the scan signal may have a second level, the emission signal may have a first level, the fifth transistor and the sixth transistor may be turned on in response to the emission signal having the first level, the first transistor may generate a driving current based on a voltage of the first node, and the light emitting element may emit light based on the driving current.

In embodiments, the pixel may further include a seventh transistor configured to transfer an anode initialization voltage to the anode of the light emitting element in response to the scan signal.

In embodiments, the seventh transistor may include a gate which receives the scan signal, a first terminal connected to a line which transfers the anode initialization voltage, and a second terminal connected to the anode of the light emitting element.

In embodiments, the anode initialization voltage may be equal to the initialization voltage.

In embodiments, the anode initialization voltage may be different from the initialization voltage.

According to embodiments, a pixel of a display device includes a capacitor connected between a line, which transfers a first power supply voltage, and a first node, a first transistor including a gate connected to the first node, a first terminal connected to a second node, and a second terminal connected to a third node, a second transistor including a gate which receives a scan signal, a first terminal connected to a data line, and a second terminal connected to the second node, a third transistor including a gate which receives the scan signal, a first terminal connected to the third node, and a second terminal connected to the first node, a fourth transistor including a gate connected to the second node, a first terminal connected to a line which transfers an initialization voltage, and a second terminal connected to the first node, a fifth transistor including a gate which receives an emission signal, a first terminal connected to the line which transfers the first power supply voltage, and a second terminal connected to the second node, a sixth transistor including a gate which receives the emission signal, a first terminal connected to the third node, and a second terminal, and a light emitting element including an anode connected to the second terminal of the sixth transistor, and a cathode connected to a line which transfers a second power supply voltage.

In embodiments, the pixel may further include a seventh transistor including includes a gate which receives the scan signal, a first terminal connected to a line which transfers an anode initialization voltage, and a second terminal connected to the anode of the light emitting element.

According to embodiments, a display device includes a display panel including a plurality of pixels, a data driver connected to each of the plurality of pixels through a data line, and a scan driver which provides a scan signal to each of the plurality of pixels. Each of the plurality of pixels includes a capacitor connected between a line, which transfers a first power supply voltage, and a first node, a first transistor including a gate connected to the first node, a first terminal connected to the second node, and a second terminal connected to a third node, a second transistor including a gate which receives the scan signal, a first terminal connected to the data line, and a second terminal connected to the second node, a third transistor including a gate which receives the scan signal, a first terminal connected to the third node, and a second terminal connected to the first node, a fourth transistor including a gate connected to the second node, a first terminal connected to a line which transfers an initialization voltage, and a second terminal connected to the first node, and a light emitting element including an anode connected to the third node, and a cathode connected to a line which transfers a second power supply voltage.

In embodiments, while the scan signal is applied and a reference voltage is provided to the data line, the fourth transistor may be turned on in response to the reference voltage transferred to the second node through the data line and the second transistor. While the scan signal is applied and a data voltage is provided to the data line, the fourth transistor may be turned off in response to the data voltage transferred to the second node through the data line and the second transistor.

As described above, in a pixel of a display device according to embodiments, a gate of a fourth transistor may be connected to a second node. In such embodiments, the fourth transistor may be turned on in response to a reference voltage applied to the second node through a data line and a second transistor, and may be turned off in response to a data voltage applied to the second node through the data line and the second transistor. Accordingly, the pixel according to embodiments may be implemented without using a separate signal (e.g., an initialization signal) for turning on or off the fourth transistor, and the number of signal lines of the display device may be reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
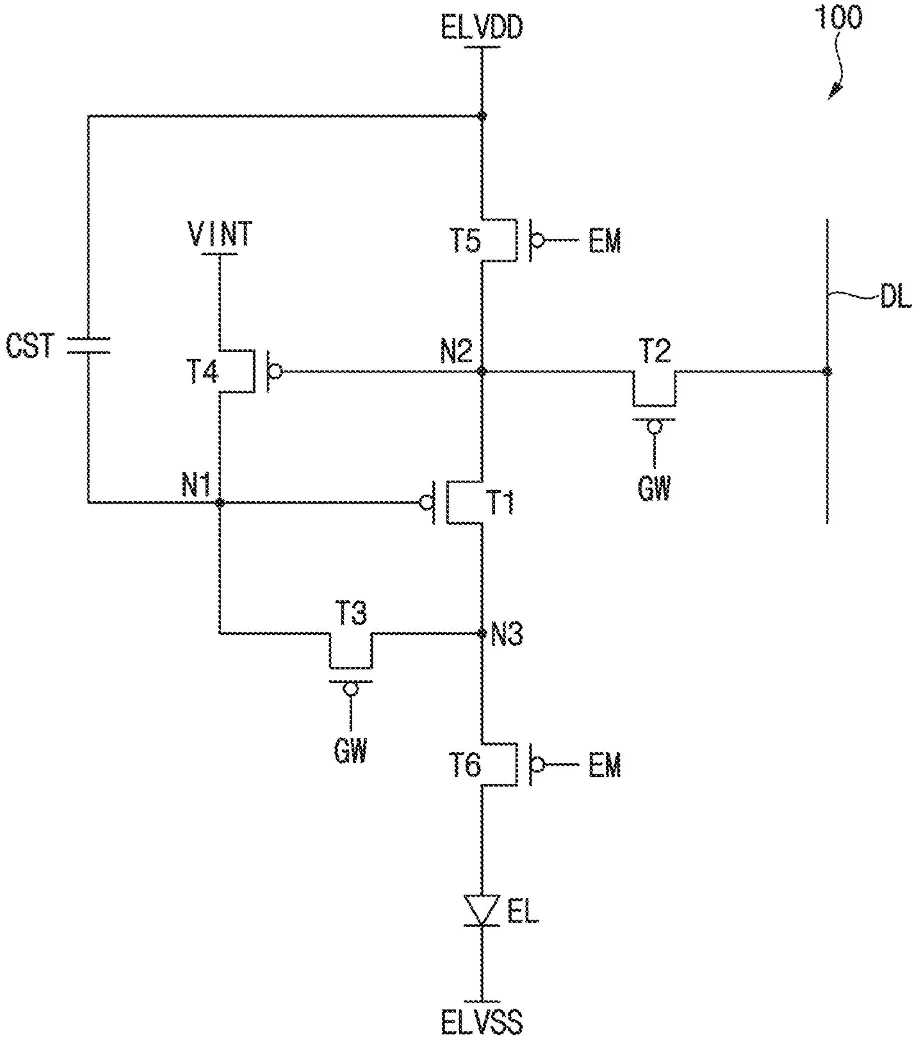
FIG. 1 is a circuit diagram illustrating a pixel according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a circuit diagram illustrating a pixel according to embodiments.

Referring to FIG. 1, a pixel 100 according to embodiments may include a capacitor CST, a first transistor T1, a second transistor T2, a third transistor T3, a fourth transistor T4 and a light emitting element EL. In some embodiments, the pixel 100 may further include an additional transistor, e.g., a fifth transistor T5 and a sixth transistor T6.

In an embodiment, the capacitor CST may be connected between a line that transfers a first power supply voltage ELVDD (e.g., a high power supply voltage) and a first node N1. The first node N1 may be a gate node connected to a gate (e.g., a gate terminal) of the first transistor T1. In embodiments, the capacitor CST may be referred to as a storage capacitor for storing a data voltage. In an embodiment, the capacitor CST may include a first electrode connected to the line that transfers the first power supply voltage ELVDD, and a second electrode connected to the first node N1.

The first transistor T1 may generate a driving current based on a voltage of the first node N1. In embodiments, the first transistor T1 may be referred to as a driving transistor for driving the light emitting element EL. In an embodiment, the first transistor T1 may include a gate connected to the first node N1, a first terminal (e.g., a source) connected to a second node N2, and a second terminal (e.g., a drain) connected to a third node N3.

The second transistor T2 may connect a data line DL to the second node N2 in response to a scan signal GW. The second node N2 may be a source node connected to the source of the first transistor T1. In embodiments, the second transistor T2 may be referred to as a scan transistor or a switching transistor that transfers a voltage of the data line DL to the second node N2. In an embodiment, the second transistor T2 may include a gate that receives the scan signal GW, a first terminal connected to the data line DL, and a second terminal connected to the second node N2.

The third transistor T3 may connect the first node N1 and the third node N3 to each other in response to the scan signal GW. The third node N3 may be a drain node connected to the drain of the first transistor T1. In an embodiment, the gate node and the drain node are connected to each other via the third transistor T3, and thus the first transistor T1 may be diode-connected or connected in a diode form. In embodiments, the third transistor T3 may be referred to as a compensation transistor for diode-connecting the first transistor T1, i.e., connection the first transistor T1 in a diode form. In an embodiment, the third transistor T3 may include a gate that receives the scan signal GW, a first terminal connected to the third node N3, and a second terminal connected to the first node N1.

The fourth transistor T4 may transfer an initialization voltage VINT to the first node N1 in response to a voltage of the second node N2. In embodiments, the fourth transistor T4 may be referred to as an initialization transistor for providing the initialization voltage VINT to the first node N1, or the gate node. In an embodiment, the fourth transistor T4 may include a gate connected to the second node N2, a first terminal connected to a line that transfers the initialization voltage VINT, and a second terminal connected to the first node N1.

The fifth transistor T5 may be connected between the line that transfers the first power supply voltage ELVDD and the second node N2, and the sixth transistor T6 may be connected between the third node N3 and an anode of the light emitting element EL. The fifth transistor T5 and the sixth transistor T6 may receive a same emission signal EM as each other. In response to the emission signal EM, the fifth transistor T5 may connect the line that transfers the first power supply voltage ELVDD and the second node N2 to each other, and the sixth transistor T6 may connect the third node N3 and the anode of the light emitting element EL to each other. In embodiments, the fifth transistor T5 and the sixth transistor T6 may be referred to as emission transistors for forming a path of the driving current from the line that transfers the first power supply voltage ELVDD to a line that transfers a second power supply voltage ELVSS (e.g., a low power supply voltage). In an embodiment, the fifth transistor T5 may include a gate that receives the emission signal EM, a first terminal connected to the line that transfers the first power supply voltage ELVDD, and a second terminal connected to the second node N2, and the sixth transistor T6 may include a gate that receives the emission signal EM, a first terminal connected to the third node N3, and a second terminal connected to the anode of the light emitting element EL.

The light emitting element EL may emit light in response to the driving current generated by the first transistor T1. In embodiments, the light emitting element EL may be an organic light emitting diode (OLED), but is not limited thereto. In another embodiment, for example, the light emitting element EL may be a nano light emitting diode (NED), a quantum dot (QD) light emitting diode, a micro-light emitting diode, an inorganic light emitting diode, or any other suitable light emitting element. In an embodiment, the light emitting element EL may include the anode connected to the third node N3 through the sixth transistor T6, and a cathode connected to the line that transfers the second power supply voltage ELVSS.

In some embodiments, as illustrated in FIG. 1, the first through sixth transistors T1 through T6 of the pixel 100 may be implemented as P-type metal oxide semiconductor (PMOS) transistors, but are not limited thereto. In other embodiments, at least a portion of the first through sixth transistors T1 through T6 may be implemented as N-type metal oxide semiconductor (NMOS) transistors.

As described above, in the pixel 100 of the display device according to embodiments, the gate of the fourth transistor T4 may be connected to the second node N2. Thus, the fourth transistor T4 may not receive a separate signal (e.g., an initialization signal), and may be turned on or off in response to the voltage of the second node N2. In some embodiments, the fourth transistor T4 may be turned on in response to a reference voltage applied to the second node N2 through the data line DL and the second transistor T2, and may be turned off in response to the data voltage applied to the second node N2 through the data line DL and the second transistor T2. Accordingly, the pixel 100 according to embodiments may be implemented without using the separate signal (e.g., the initialization signal) for turning on or off the fourth transistor T4, and the number of signal lines of the display device including the pixel 100 may be reduced.

Hereinafter, an operation of the pixel 100 according to embodiments will be described with reference to FIGS. 1 through 5.

Figure 2:
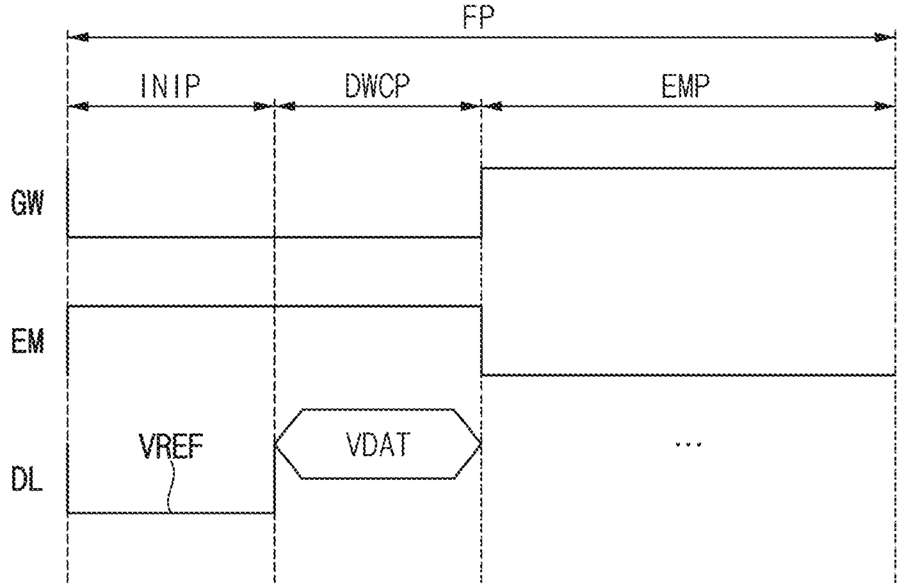
FIG. 2 is a signal timing diagram illustrating an example of an operation of a pixel according to embodiments.
Figure 3:
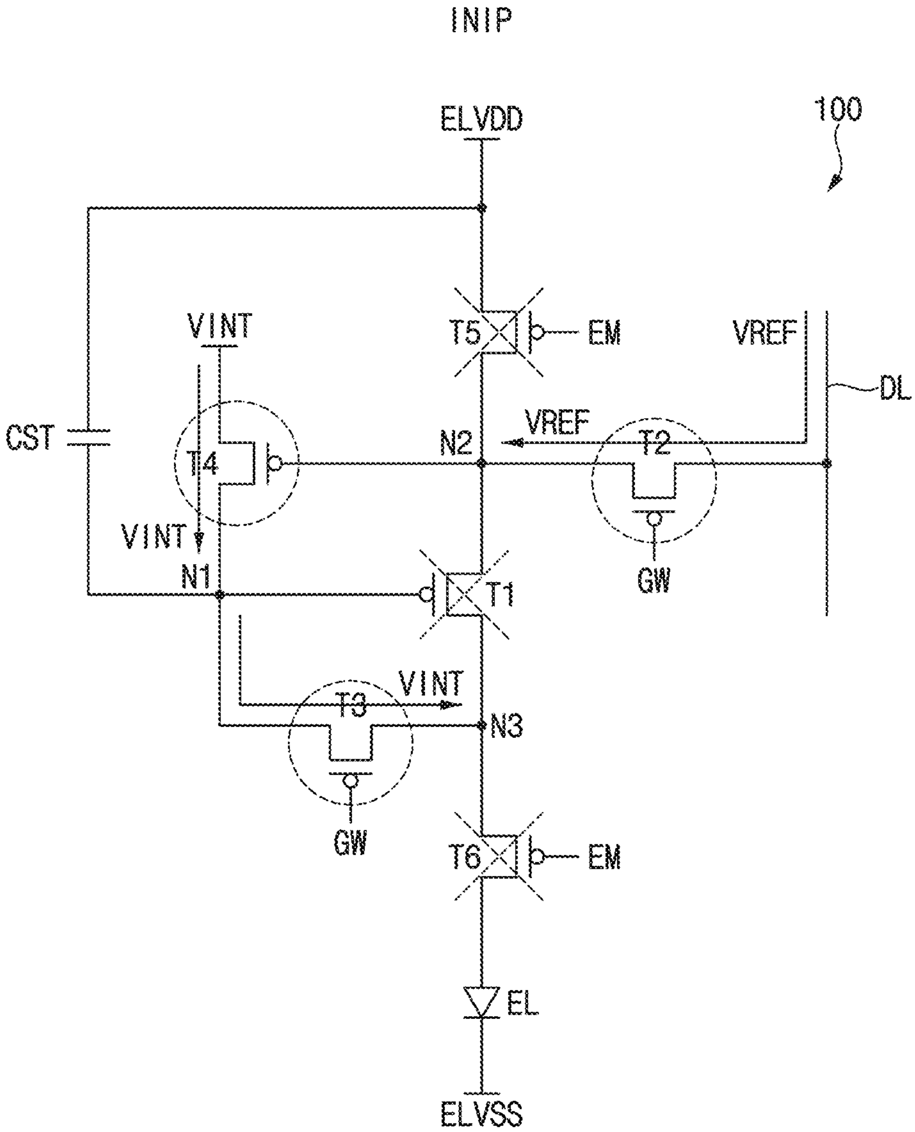
FIG. 3 is a circuit diagram illustrating an operation of a pixel in an initialization period.
Figure 4:
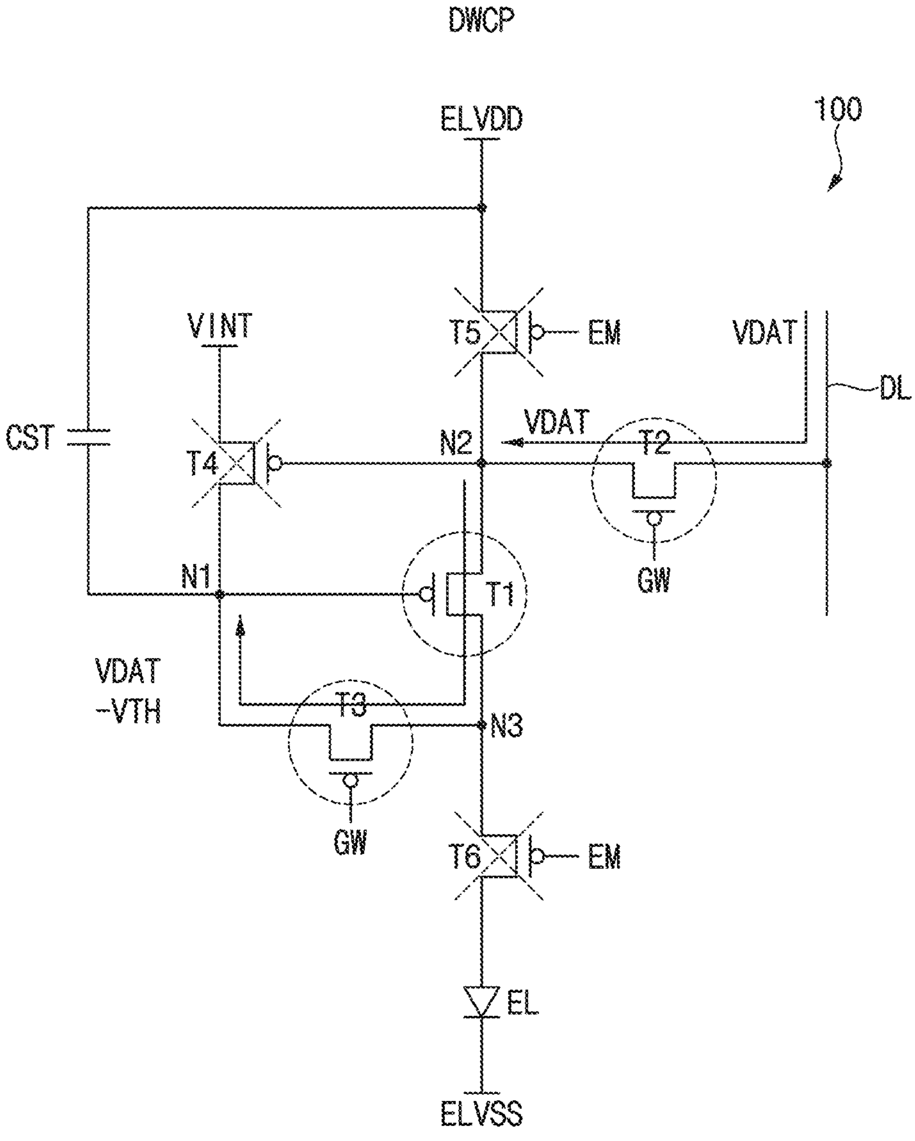
FIG. 4 is a circuit diagram illustrating an operation of a pixel in a data writing and compensation period.
Figure 5:
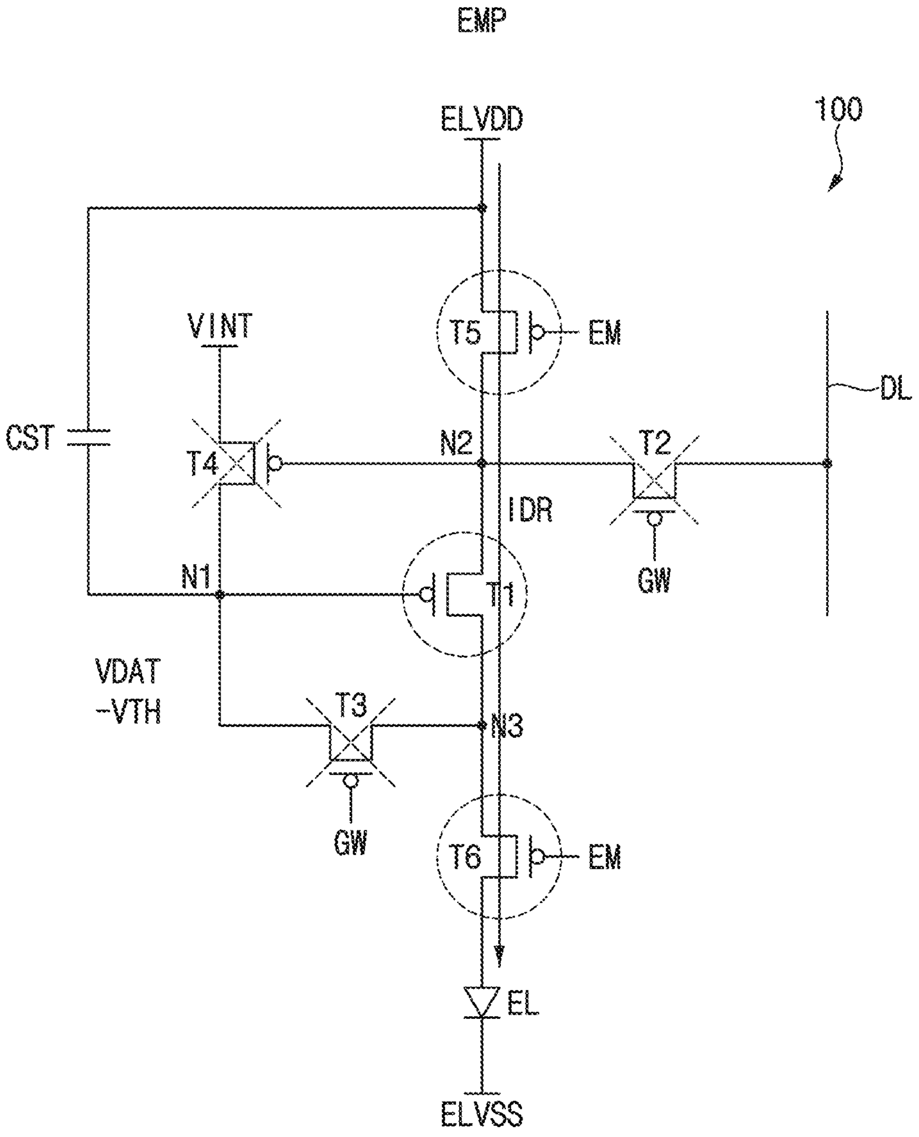
FIG. 5 is a circuit diagram illustrating an operation of a pixel in an emission period.

FIG. 2 is a signal timing diagram illustrating an example of an operation of a pixel according to embodiments, FIG. 3 is a circuit diagram illustrating an operation of a pixel in an initialization period, FIG. 4 is a circuit diagram illustrating an operation of a pixel in a data writing and compensation period, and FIG. 5 is a circuit diagram illustrating an operation of a pixel in an emission period.

Referring to FIGS. 1 and 2, a frame period FP for the pixel 100 may include an initialization period INIP in which the first node N1 and the third node N3 are initialized, a data writing and compensation period DWCP in which the data voltage VDAT is provided through the data line DL, and an emission period EMP in which the light emitting element EL emits light.

In the initialization period INIP, the scan signal GW may have a first level, the emission signal EM may have a second level, and the reference voltage VREF may be provided through the data line DL. In some embodiments, the first level may be an active level for turning on each transistor, and the second level may be an inactive level for turning off each transistor. In an embodiment, for example, as illustrated in FIG. 2, the first level may be a low level and the second level may be a high level. In an embodiment, as illustrated in FIG. 3, in the initialization period INIP, the fifth and sixth transistors T5 and T6 may be turned off in response to the emission signal EM having the second level. The second transistor T2 may be turned on in response to the scan signal GW having the first level, and may transfer the reference voltage VREF of the data line DL to the second node N2. The fourth transistor T4 may be turned on in response to the reference voltage VREF transferred to the second node N2 through the data line DL and the second transistor T2. In some embodiments, to turn on the fourth transistor T4, the reference voltage VREF applied to the gate of the fourth transistor T4 may be lower than the initialization voltage VINT applied to one terminal (e.g., a source) of the fourth transistor T4. That is, the initialization voltage VINT and the reference voltage VREF may be set in a way such that the initialization voltage VINT is higher than the reference voltage VREF. In an embodiment, for example, the initialization voltage VINT may be about 3 volts (V), and the reference voltage VREF may be about 0 V. However, the initialization voltage VINT and the reference voltage VREF are not limited thereto.

In the initialization period INIP, the fourth transistor T4 that is turned on in response to the reference voltage VREF at the second node N2 may transfer the initialization voltage VINT to the first node N1. Since the initialization voltage VINT applied to the first node N1 is higher than the reference voltage VREF applied to the second node N2, the first transistor T1 may be turned off. In addition, the third transistor T3 may be turned on in response to the scan signal GW having the first level, and may transfer the initialization voltage VINT at the first node N1 to the third node N3. Accordingly, the first node N1 and the third node N3 may be initialized based on the initialization voltage VINT. Since the first node N1 (e.g., a gate node) is initialized to the initialization voltage VINT, a compensation operation in a diode connection method may be normally performed in the data writing and compensation period DWCP. Further, since the third node N3 (e.g., a drain node) is initialized to the initialization voltage VINT, residual charges remaining at the drain node may be discharged or removed.

In the data writing and compensation period DWCP, the scan signal GW may have the first level, the emission signal EM may have the second level, and the data voltage VDAT may be provided through the data line DL. In an embodiment, as illustrated in FIG. 4, in the data writing and compensation period DWCP, the fifth and sixth transistors T5 and T6 may be turned off in response to the emission signal EM having the second level. The second transistor T2 may be turned on in response to the scan signal GW having the first level, and may transfer the data voltage VDAT of the data line DL to the second node N2. The fourth transistor T4 may be turned off in response to the data voltage VDAT transferred to the second node N2 through the data line DL and the second transistor T2. In some embodiments, to turn off the fourth transistor T4, the data voltage VDAT applied to the gate of the fourth transistor T4 may be higher than the initialization voltage VINT applied to the one terminal (e.g., the source) of the fourth transistor T4. That is, the initialization voltage VINT and a range of the data voltage VDAT may be set in a way such that the initialization voltage VINT is lower than the range of the data voltage VDAT, or that the initialization voltage VINT is lower than a minimum data voltage (e.g., the data voltage VDAT corresponding to a highest gray level). In an embodiment, for example, the initialization voltage VINT may be about 3 V, and the data voltage VDAT may be in a range from about 5V to about 7 V. However, the initialization voltage VINT and the data voltage VDAT are not limited thereto.

In the data writing and compensation period DWCP, the third transistor T3 may be turned on in response to the scan signal GW having the first level, and may diode-connect the first transistor T1. Since the data voltage VDAT of the second node N2 is applied to the first node N1 through the diode-connected first transistor T1, a voltage (VDAT-VTH) obtained by subtracting a threshold voltage (VTH) of the first transistor T1 from the data voltage VDAT may be applied to the first node N1. This operation may be referred to as a compensation operation in a diode connection method. Further, the storage capacitor CST may store the voltage VDAT-VTH at the first node N1.

In the emission period EMP, the scan signal GW may have the second level, and the emission signal EM may have the first level. In an embodiment, as illustrated in FIG. 5, in the emission period EMP, the second and third transistors T2 and T3 may be turned off in response to the scan signal GW having the second level. Further, a turn-off state of the fourth transistor T4 may be maintained based on the first power supply voltage ELVDD transferred to the second node N2 through the fifth transistor T5. The first transistor T1 may generate the driving current IDR based on the voltage of the first node N1, or the voltage VDAT-VTH obtained by subtracting the threshold voltage VTH from the data voltage VDAT. The fifth transistor T5 may be turned on in response to the emission signal EM having the first level, and may connect the line that transfers the first power supply voltage ELVDD to the second node N2. The sixth transistor T6 may be turned on in response to the emission signal EM having the first level, and may connect the third node N3 to the anode of the light emitting element EL. Thus, the fifth and sixth transistors T5 and T6 may form a path for the driving current IDR from the line that transfers the first power supply voltage ELVDD to the line that transfers the second power supply voltage ELVSS. The light emitting element EL may emit light based on the driving current IDR generated by the first transistor T1.

As described above, in the pixel 100 of the display device according to embodiments, since the fourth transistor T4 is be turned on and off based on the reference voltage VREF and the data voltage VDAT provided through the data line DL, the display device including the pixel 100 may be implemented without using a separate signal (e.g., an initialization signal). That is, the pixel 100 may be driven using only two signals GW and EM, and the number of signal lines of the display device including the pixel 100 may be reduced.

Figure 6:
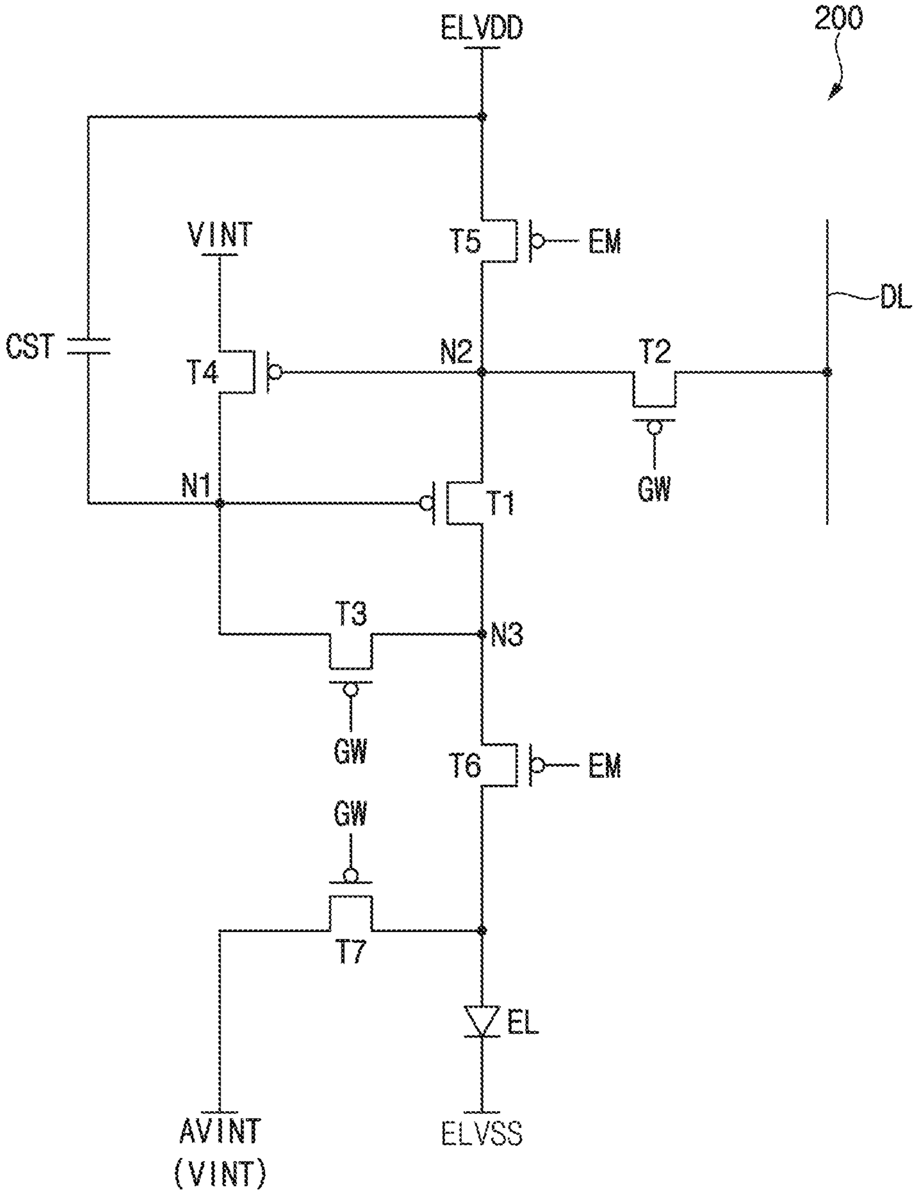
FIG. 6 is a circuit diagram illustrating a pixel according to embodiments.

FIG. 6 is a circuit diagram illustrating a pixel according to embodiments.

Referring to FIG. 6, a pixel 200 according to embodiments may include a capacitor CST, a first transistor T1, a second transistor T2, a third transistor T3, a fourth transistor T4, a fifth transistor T5, a sixth transistor T6, a seventh transistor T7 and a light emitting element EL. The pixel 200 of FIG. 6 may have substantially the same configuration and substantially the same operation as a pixel 100 of FIG. 1, except that the pixel 200 may further include the seventh transistor T7.

The seventh transistor T7 may transfer an anode initialization voltage AVINT to an anode of the light emitting element EL in response to a scan signal GW. In some embodiments, in an initialization period INIP and a data writing and compensation period DWCP illustrated in FIG. 2, the seventh transistor T7 may provide the anode initialization voltage AVINT to the anode of the light emitting element EL, and the anode of the light emitting element EL may be initialized based on the anode initialization voltage AVINT. In some embodiments, the seventh transistor T7 may include a gate that receives the scan signal GW, a first terminal connected to a line that transfers the anode initialization voltage AVINT, and a second terminal connected to the anode of the light emitting element EL.

In some embodiments, the anode initialization voltage AVINT may be substantially the same as an initialization voltage VINT, and the line that transfers the anode initialization voltage AVINT and a line that transfers the initialization voltage VINT may be the same line. In other embodiments, the anode initialization voltage AVINT may be different from the initialization voltage VINT, and the line that transfers the anode initialization voltage AVINT may be different from the line that transfers the initialization voltage VINT.

Figure 7:
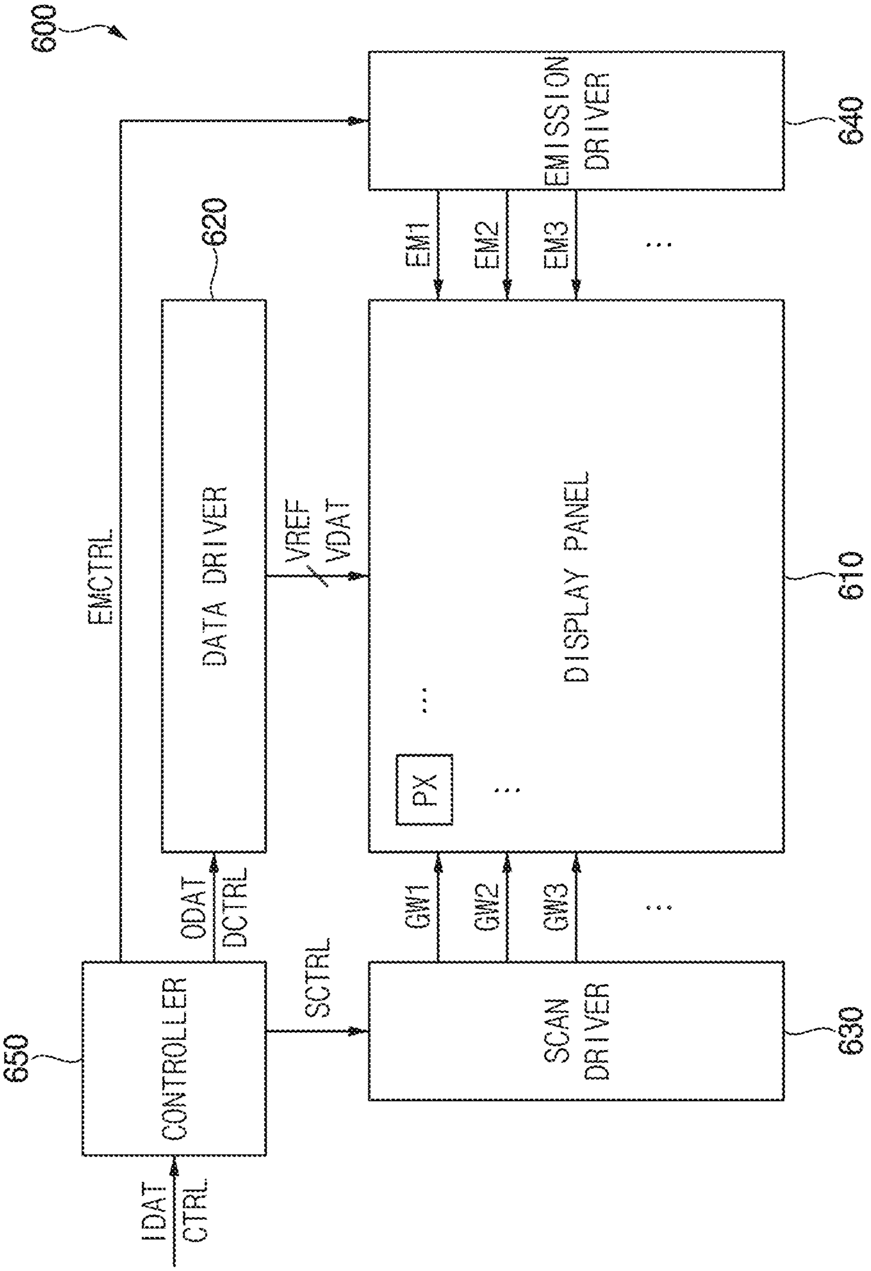
FIG. 7 is a block diagram illustrating a display device according to embodiments.
Figure 8:
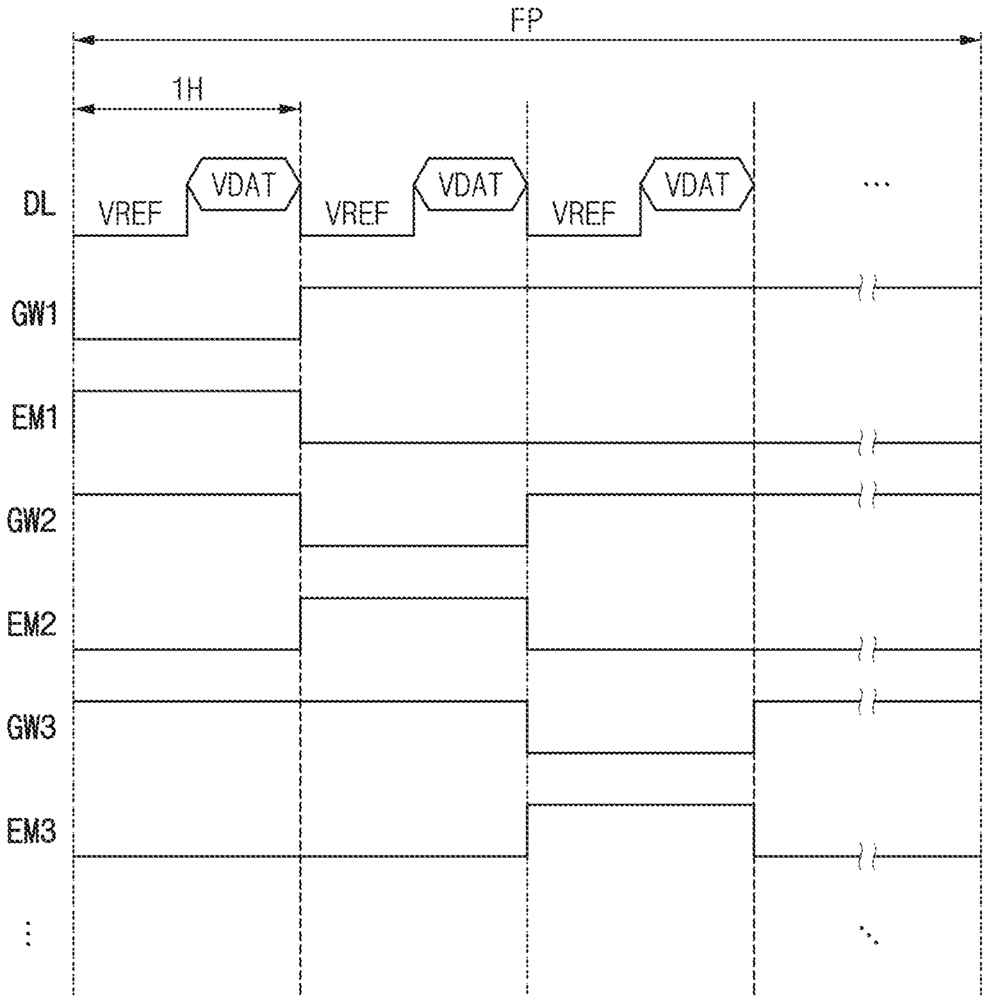
FIG. 8 is a signal timing diagram illustrating an example of an operation of a display device according to embodiments.

FIG. 7 is a block diagram illustrating a display device according to embodiments, and FIG. 8 is a signal timing diagram illustrating an example of an operation of a display device according to embodiments.

Referring to FIG. 7, a display device 600 according to embodiments may include a display panel 610 that includes a plurality of pixels PX, a data driver 620 that is connected to each of the plurality of pixels PX through a data line, a scan driver 630 that provides scan signals GW1, GW2, GW3, . . . to the plurality of pixels PX, an emission driver 640 that provides emission signals EM1, EM2, EM3, . . . to the plurality of pixels PX, and a controller 650 that controls the data driver 620, the scan driver 630 and the emission driver 640.

The display panel 610 may include the plurality of pixels PX. According to embodiments, each pixel PX of the display panel 610 may be a pixel 100 of FIG. 1, a pixel 200 of FIG. 6, or the like. In each pixel PX, a fourth transistor may be turned on based on a reference voltage VREF provided through the data line from the data driver 620, and may be turned off based on a data voltage VDAT provided from the data driver 620 through the data line. Accordingly, the display device 600 may be implemented without using a separate signal (e.g., an initialization signal) for turning on or off the fourth transistor, and the number of signal lines of the display device 600 may be reduced.

The data driver 620 may generate the reference voltage VREF and the data voltages VDAT based on output image data ODAT and a data control signal DCTRL received from the controller 650, and may provide the reference voltage VREF and the data voltages VDAT to the plurality of pixels PX. In some embodiments, the data control signal DCTRL may include, but is not limited to, an output data enable signal, a horizontal start signal, and a load signal. In some embodiments, the data driver 620 may alternately provide the reference voltage VREF and the data voltage (VDAT) to each data line. Further, in each horizontal time, the data driver 620 may sequentially output the reference voltage VREF and the data voltage VDAT to each data line. In an embodiment, for example, as illustrated in FIG. 8, in a first horizontal time 1H allocated to a first pixel row, the data driver 620 may first output the reference voltage VREF to each data line, and then may output the data voltage VDAT for the pixel PX disposed in the first pixel row to the data line. In such an embodiment, in a second horizontal time allocated to a second pixel row, the data driver 620 may sequentially output the reference voltage VREF and the data voltage VDAT for the pixel PX disposed in the second pixel row to each data line. In such an embodiment, in a third horizontal time allocated to a third pixel row, the data driver 620 may sequentially output the reference voltage VREF and the data voltage VDAT for the pixel PX disposed in the third pixel row to each data line. In some embodiments, the data driver 620 and the controller 650 may be implemented as a single integrated circuit, and the single integrated circuit may be referred to as a timing controller embedded data driver (TED). In other embodiments, the data driver 620 and the controller 650 may be implemented as separate integrated circuits.

The scan driver 630 may provide the scan signals GW1, GW2, GW3, . . . to the plurality of pixels PX based on a scan control signal SCTRL received from the controller 650. The scan control signal SCTRL may include, but is not limited to, a scan start signal and a scan clock signal. In an embodiment, as illustrated in FIG. 8, the scan driver 630 may sequentially provide the scan signals GW1, GW2, GW3, . . . to the plurality of pixels PX on a row-by-row basis. In an embodiment, for example, the scan driver 630 may provide a first scan signal GW1 having a first level (e.g., a low level) to the first pixel row, and then may provide a second scan signal GW2 having the first level to the second pixel row. Thereafter, the scan driver 630 may provide a third scan signal GW3 having the first level to the third pixel row. In some embodiments, the scan driver 630 may be integrated or formed in a peripheral region of the display panel 610. In other embodiments, the scan driver 630 may be integrated or formed in a display region of the display panel 610. In still other embodiments, the scan driver 630 may be implemented as one or more integrated circuits.

The emission driver 640 may provide the emission signals EM1, EM2, EM3, . . . to the plurality of pixels PX based on an emission control signal EMCTRL received from the controller 650. The emission control signal EMCTRL may include, but is not limited to, an emission start signal and an emission clock signal. In an embodiment, as illustrated in FIG. 8, the emission driver 640 may sequentially provide the emission signals EM1, EM2, EM3, . . . to the plurality of pixels PX on a row-by-row basis. In some embodiments, the emission driver 640 may be integrated or formed in the peripheral region of the display panel 610. In other embodiments, the emission driver 640 may be integrated or formed in the display region of the display panel 610. In still other embodiments, the emission driver 640 may be implemented as one or more integrated circuits.

The controller 650 (e.g., a timing controller) may receive input image data IDAT and a control signal CTRL from an external host processor (e.g., a graphics processing unit (GPU), an application processor (AP), or a graphics card). In some embodiments, the control signal CTRL may include, but is not limited to, a vertical synchronization signal, a horizontal synchronization signal, an input data enable signal, and a master clock signal. The controller 650 may generate the output image data ODAT, the data control signal DCTRL, the scan control signal SCTRL and the emission control signal EMCTRL based on the input image data IDAT and the control signal CTRL. The controller 650 may control the data driver 620 by providing the output image data ODAT and the data control signal DCTRL to the data driver 620, may control the scan driver 630 by providing the scan control signal SCTRL to the scan driver 630, and may control the emission driver 640 by providing the emission control signal EMCTRL to the emission driver 640.

Figure 9:
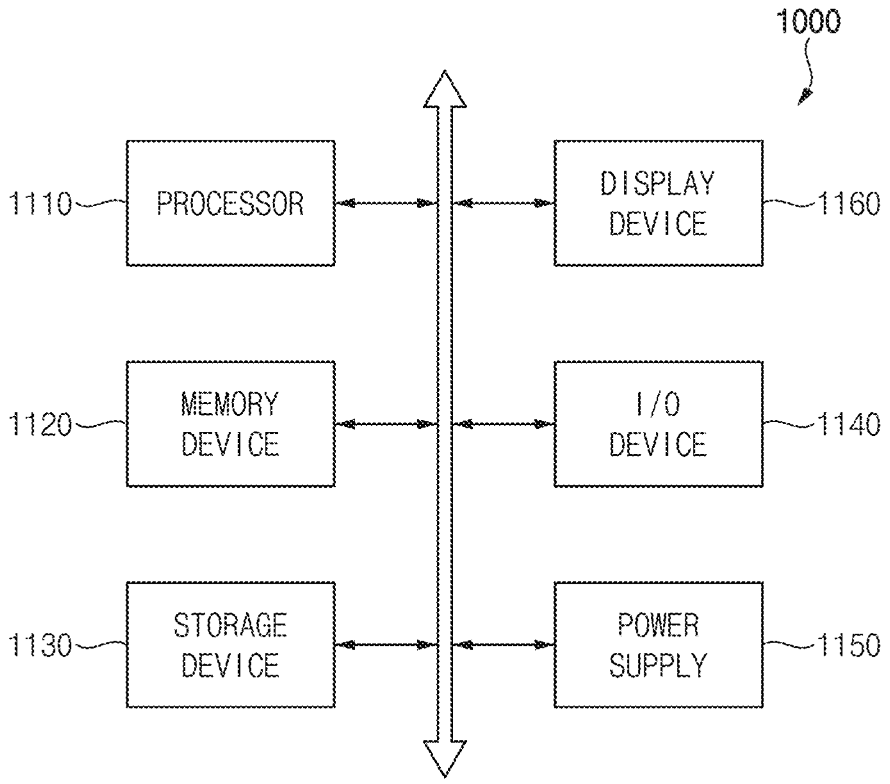
FIG. 9 is a block diagram illustrating an electronic device including a display device according to embodiments.

FIG. 9 is a block diagram illustrating an electronic device including a display device according to embodiments.

Referring to FIG. 9, an embodiment of an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. In an embodiment, for example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, a gate of a fourth transistor of each pixel may be connected to a second node. Further, the fourth transistor may be turned on in response to a reference voltage applied to the second node through a data line and a second transistor, and may be turned off in response to a data voltage applied to the second node through the data line and the second transistor. Accordingly, the display device 1160 may be implemented without using a separate signal (e.g., an initialization signal) for turning on or off the fourth transistor, and the number of signal lines of the display device 1160 may be reduced.

Embodiments of the inventions may be applied to any display device 1160 and any electronic device 1100 including the display device 1160, for example, a smart phone, a wearable electronic device, a tablet computer, a mobile phone, a television (TV) (e.g., a digital TV, a three-dimensional (3D) TV, etc.), a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel of a display device, the pixel comprising:

a capacitor connected between a line, which transfers a first power supply voltage, and a first node;

a first transistor including a gate connected to the first node, a first terminal connected to a second node, and a second terminal connected to a third node;

a second transistor including a gate which receives a scan signal, a first terminal connected to a data line, and a second terminal connected to the second node;

a third transistor including a gate which receives the scan signal, a first terminal connected to the third node, and a second terminal connected to the first node;

a fourth transistor including a gate connected to the second node, a first terminal connected to a line which transfers an initialization voltage, and a second terminal connected to the first node; and a light emitting element including an anode connected to the third node, and a cathode connected to a line which transfers a second power supply voltage, wherein, in a period during which the scan signal is provided to the second transistor and a reference voltage is applied to the data line, the fourth transistor is turned on in response to the reference voltage transferred to the second node through the data line and the second transistor such that the initialization voltage, which is higher than the reference voltage, is applied to the first node.

2. The pixel of claim 1, wherein in a period during which the scan signal is applied to the second transistor and a data voltage is provided to the data line, the fourth transistor is turned off in response to the data voltage transferred to the second node through the data line and the second transistor.

3. The pixel of claim 2, wherein the initialization voltage is lower than the data voltage.

4. The pixel of claim 1, further comprising:

a fifth transistor connected between the line, which transfers the first power supply voltage, and the second node, wherein the fifth transistor receives an emission signal; and a sixth transistor connected between the third node and the anode of the light emitting element, wherein the sixth transistor receives the emission signal.

5. The pixel of claim 4, wherein the fifth transistor includes a gate which receives the emission signal, a first terminal connected to the line which transfers the first power supply voltage, and a second terminal connected to the second node, and wherein the sixth transistor includes a gate which receives the emission signal, a first terminal connected to the third node, and a second terminal connected to the anode of the light emitting element.

6. The pixel of claim 4, wherein the first through sixth transistors are P-type metal oxide semiconductor (PMOS) transistors.

7. The pixel of claim 4, wherein a frame period for the pixel includes:

an initialization period in which the first node and the third node are initialized;

a data writing and compensation period in which a data voltage is provided through the data line; and an emission period in which the light emitting element emits light.

8. The pixel of claim 7, wherein, in the initialization period, the scan signal has a first level, the emission signal has a second level, a reference voltage is provided through the data line, the second transistor transfers the reference voltage of the data line to the second node in response to the scan signal having the first level, the fourth transistor transfers the initialization voltage to the first node in response to the reference voltage of the second node, the third transistor transfers the initialization voltage of the first node to the third node in response to the scan signal having the first level, and the first node and the third node are initialized based on the initialization voltage.

9. The pixel of claim 7, wherein, in the data writing and compensation period, the scan signal has a first level, the emission signal has a second level, a data voltage is provided through the data line, the second transistor transfers the data voltage of the data line to the second node in response to the scan signal having the first level, the third transistor diode-connects the first transistor in response to the scan signal having the first level, and a voltage obtained by subtracting a threshold voltage of the first transistor from the data voltage is applied to the first node through the diode-connected first transistor.

10. The pixel of claim 7, wherein, in the emission period, the scan signal has a second level, the emission signal has a first level, the fifth transistor and the sixth transistor are turned on in response to the emission signal having the first level, the first transistor generates a driving current based on a voltage of the first node, and the light emitting element emits light based on the driving current.

11. The pixel of claim 1, further comprising:

a seventh transistor which transfers an anode initialization voltage to the anode of the light emitting element in response to the scan signal.

12. The pixel of claim 11, wherein the seventh transistor includes a gate which receives the scan signal, a first terminal connected to a line which transfers the anode initialization voltage, and a second terminal connected to the anode of the light emitting element.

13. The pixel of claim 11, wherein the anode initialization voltage is equal to the initialization voltage.

14. The pixel of claim 11, wherein the anode initialization voltage is different from the initialization voltage.

15. A pixel of a display device, the pixel comprising:

a capacitor connected between a line, which transfers a first power supply voltage, and a first node;

a first transistor including a gate connected to the first node, a first terminal connected to a second node, and a second terminal connected to a third node;

a second transistor including a gate which receives a scan signal, a first terminal connected to a data line, and a second terminal connected to the second node;

a third transistor including a gate which receives the scan signal, a first terminal connected to the third node, and a second terminal connected to the first node;

a fourth transistor including a gate connected to the second node, a first terminal connected to a line which transfers an initialization voltage, and a second terminal connected to the first node;

a fifth transistor including a gate which receives an emission signal, a first terminal connected to the line which transfers the first power supply voltage, and a second terminal connected to the second node;

a sixth transistor including a gate which receives the emission signal, a first terminal connected to the third node, and a second terminal; and a light emitting element including an anode connected to the second terminal of the sixth transistor, and a cathode connected to a line which transfers a second power supply voltage, wherein, in a period during which the scan signal is provided to the second transistor and a reference voltage is applied to the data line, the fourth transistor is turned on in response to the reference voltage transferred to the second node through the data line and the second transistor such that the initialization voltage, which is higher than the reference voltage, is applied to the first node.

16. The pixel of claim 15, further comprising:

a seventh transistor including includes a gate which receives the scan signal, a first terminal connected to a line which transfers an anode initialization voltage, and a second terminal connected to the anode of the light emitting element.

17. An electronic device comprising:

a display panel including a plurality of pixels;

a data driver connected to each of the plurality of pixels through a data line; and a scan driver configured to provide a scan signal to each of the plurality of pixels, wherein each of the plurality of pixels includes:

a capacitor connected between a line, which transfers a first power supply voltage, and a first node;

a first transistor including a gate connected to the first node, a first terminal connected to a second node, and a second terminal connected to a third node;

a second transistor including a gate which receives the scan signal, a first terminal connected to the data line, and a second terminal connected to the second node;

a third transistor including a gate which receives the scan signal, a first terminal connected to the third node, and a second terminal connected to the first node;

a fourth transistor including a gate connected to the second node, a first terminal connected to a line which transfers an initialization voltage, and a second terminal connected to the first node; and a light emitting element including an anode connected to the third node, and a cathode connected to a line which transfers a second power supply voltage, wherein, in a period during which the scan signal is provided to the second transistor and a reference voltage is applied to the data line, the fourth transistor is turned on in response to the reference voltage transferred to the second node through the data line and the second transistor such that the initialization voltage, which is higher than the reference voltage, is applied to the first node.

18. The display-electronic device of claim 17, wherein, in a period during which the scan signal is applied to the second transistor and a data voltage is provided to the data line, the fourth transistor is turned off in response to the data voltage transferred to the second node through the data line and the second transistor.

* * * * *